United States Patent
Breton et al.

(10) Patent No.: US 8,309,621 B2
(45) Date of Patent: *Nov. 13, 2012

(54) CURABLE PHASE CHANGE INKS

(75) Inventors: Marcel P Breton, Mississauga (CA);
Michelle N Chretien, Mississauga (CA);
Barkev Keoshkerian, Thornhill (CA)

(73) Assignee: Xerox Corporation, Norwalk, CT (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/971,467

(22) Filed: Dec. 17, 2010

(65) Prior Publication Data

US 2011/0148979 A1   Jun. 23, 2011

Related U.S. Application Data

(63) Continuation-in-part of application No. 12/642,538, filed on Dec. 18, 2009, and a continuation-in-part of application No. 12/703,817, filed on Feb. 11, 2010, now Pat. No. 8,158,693.

(51) Int. Cl.
C08J 3/28 (2006.01)
C08F 2/50 (2006.01)
C09D 11/00 (2006.01)
C09D 11/02 (2006.01)
C09D 11/10 (2006.01)
C09D 11/12 (2006.01)

(52) U.S. Cl. ............ 522/182; 522/71; 522/74; 522/104; 522/107; 522/113; 522/114; 522/120; 522/121; 522/153; 522/178; 522/909; 106/31.13; 106/31.6; 427/508; 427/511; 427/514

(58) Field of Classification Search ............ 522/71, 522/74, 113, 120, 121, 111, 104, 107, 114, 522/153, 178, 182, 909; 106/31.13, 31.6; 427/508, 511, 514; 523/160, 161
See application file for complete search history.

(56) References Cited

U.S. PATENT DOCUMENTS

| | | | | |
|---|---|---|---|---|
| 4,167,503 A | * | 9/1979 | Cipriani | 524/297 |
| 6,896,937 B2 | * | 5/2005 | Woudenberg | 427/511 |
| 2007/0123606 A1 | * | 5/2007 | Toma et al. | 523/160 |

OTHER PUBLICATIONS

Paligen Rotviolett L5100 Technical Data Sheet from BASF. (1999). [online]. [Retrieved online on Dec. 28, 2011]. Retrieved from Internet <URL:http://www2.basf.us/pc_coatings/pdfs/paliogen_1_5100.pdf>.*
U.S. Appl. No. 12/642,538 (Breton et al.).
U.S. Appl. No. 12/703,817 (Breton et al.).
U.S. Appl. No. 12/835,198 (Breton et al.).
U.S. Appl. No. 12/704,194 (Breton et al.).
U.S. Appl. No. 12/642,569 (Breton et al.).

* cited by examiner

*Primary Examiner* — Sanza McClendon
(74) *Attorney, Agent, or Firm* — Judith L. Byorick

(57) ABSTRACT

Disclosed is a radiation curable solid ink composition comprising:
(a) a curable wax;
(b) at least one curable monomer, oligomer, or prepolymer;
(c) at least one photoinitiator; and
(d) a pigment colorant;
wherein the ink is a solid at a first temperature of about 25° C. or lower; and
wherein the ink is a liquid at a second temperature of about 40° C. or higher;
said ink being curable by free-radical polymerization.

20 Claims, 1 Drawing Sheet

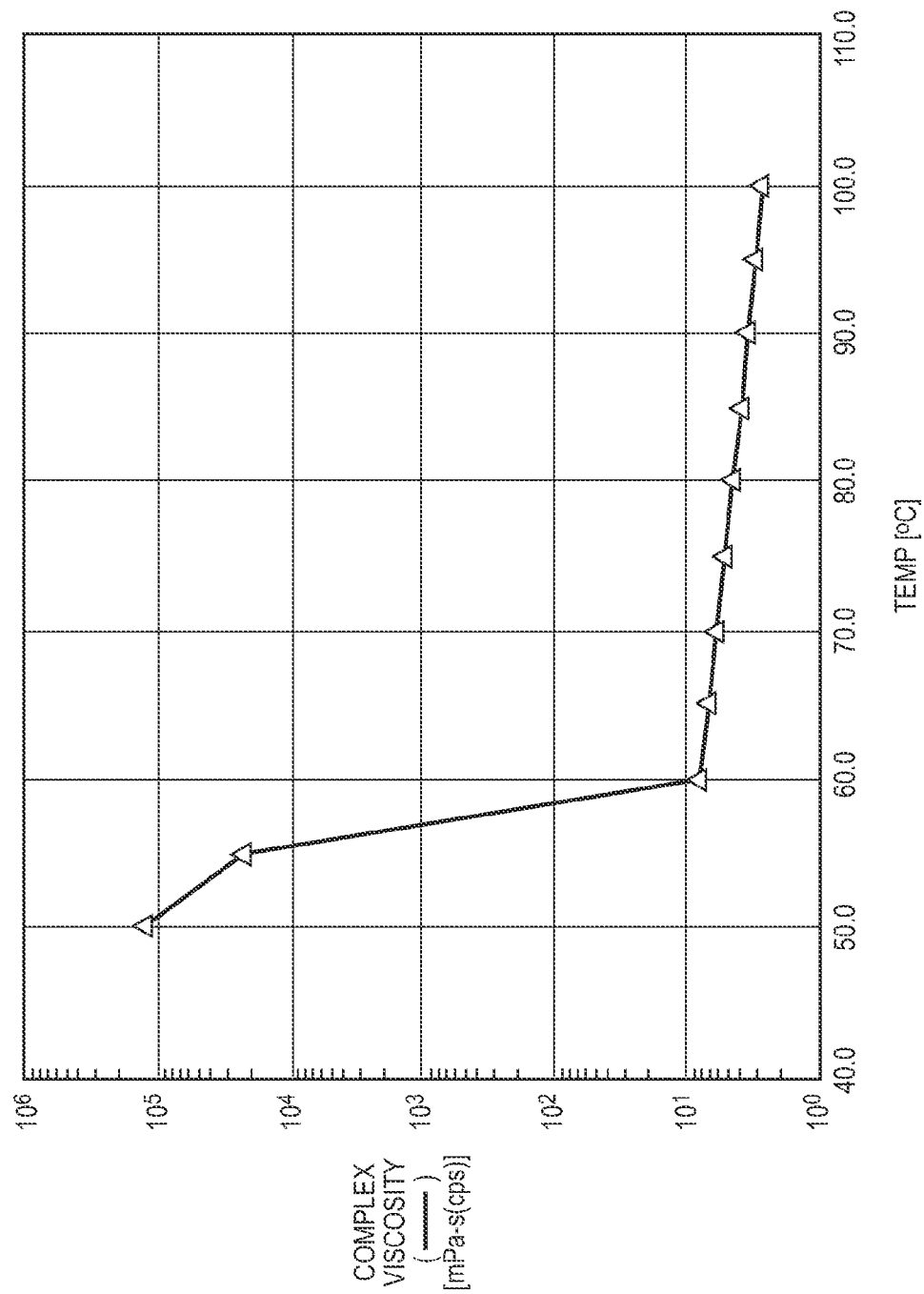

CURABLE PHASE CHANGE INKS

This application is a continuation-in-part of U.S. application Ser. No. 12/642,538, filed Dec. 18, 2009, and U.S. application Ser. No. 12/703,817, filed Feb. 11, 2010, the disclosures of each of which are totally incorporated herein by reference.

CROSS-REFERENCE TO RELATED APPLICATIONS

Reference is made to U.S. application Ser. No. 12/642,538, filed Dec. 18, 2009, entitled "Curable Solid Ink Compositions," with the named inventors Marcel P. Breton, Michelle N. Chrétien, and Peter G. Odell, the disclosure of which is totally incorporated herein by reference.

Reference is made to U.S. application Ser. No. 12/703,817, filed Feb. 11, 2010, entitled "Process For Preparing Stable Pigmented Curable Solid Inks," with the named inventors Marcel P. Breton, Michelle N. Chrétien, and Barkev Keoshkerian, the disclosure of which is totally incorporated herein by reference.

Reference is made to U.S. application Ser. No. 12/972,138, filed concurrently herewith, entitled "Curable Solid Inks for Raised Print Applications and Methods for Using the Same," with the named inventors Marcel P. Breton, Michelle N. Chrétien, Barkev Keoshkerian, Jennifer Belelie, and Naveen Chopra, the disclosure of which is totally incorporated herein by reference.

BACKGROUND

Described herein are curable inks, and more particularly, radiation curable solid ink compositions comprising solid monomers and reactive wax for direct to substrate imaging applications, particularly their use in ink jet printing.

In general, solid inks (also referred to as phase change inks or hot melt inks) are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. A series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye, a single pigment, a mixture of dyes, a mixture of pigments, or a combination thereof.

Solid inks typically used with ink-jet printers have a wax-based ink carrier, for example, a crystalline wax-based ink carrier. Such solid ink-jet inks provide vivid color images. In typical systems, the crystalline-wax inks are jetted onto a transfer member, for example, an aluminum drum, at temperatures of approximately 120 to about 140° C. The wax-based inks are heated to such high temperatures to decrease their viscosity for efficient and proper jetting onto the transfer member. The transfer member is typically at a temperature of about 60° C., so that the wax will cool sufficiently to solidify or crystallize. As the transfer member rolls over the recording medium, for example paper, the image comprised of wax-based ink is pressed into the paper.

However, the use of crystalline waxes places limitations on the printing process used for conventional solid inks, particularly if the inks are used in a direct to paper application. First, the printhead must be kept at a temperature of about 120° C. which can lead to a number of problems. At these high temperatures, dyes that are molecularly dissolved in the ink carrier are often susceptible to unwanted interactions leading to poor ink performance. For example, the dyes may be susceptible to thermal degradation, dye diffusion from the ink into the paper or other substrate, leading to poor image quality and showthrough, leaching of the dye into other solvents making contact with the image, leading to poor water/solvent-fastness. Further, for direct to paper applications it is desirable to heat the image after printing to achieve dot gain. In addition, for some substrates, the optimum spreading of the ink drops is difficult to achieve. Moreover, when the printhead is cooled and re-warmed, the resulting contraction and expansion of the ink requires a purge cycle to achieve optimum printhead performance. Particularly, the robustness (for example, smear resistance) of current inks can be insufficient for many potential applications.

Radiation curable inks generally comprise at least one curable monomer, a colorant, and a radiation activated initiator that initiates polymerization of curable components of the ink. Radiation-curable inks can be employed in ink jet printing systems. Radiation-curable phase-change inks are known as well, as disclosed in, for example, U.S. Pat. Nos. 7,153,349, 7,259,275, 7,270,408, 7,271,284, 7,276,614, 7,279,506, 7,279,587, 7,293,868, 7,317,122, 7,323,498, 7,384,463, 7,449,515, 7,459,014, 7,531,582, 7,538,145, 7,541,406, 7,553,011, 7,556,844, 7,559,639, 7,563,489, 7,578,587, 7,625,956, 7,632,546, 7,674,842, 7,681,966, 7,683,102, 7,690,782, 7,691,920, 7,699,922, 7,714,040, 7,754,779, 7,812,064, and 7,820,731, the disclosures of each of which are totally incorporated herein by reference. Radiation-curable phase change inks can exhibit additional desirable characteristics such as improved hardness and scratch-resistance and improved adhesion to various substrates. Radiation-curable gel inks can also exhibit advantages in that dot spread of the ink can be controlled, the ink does not bleed excessively into the substrate.

While currently available ink compositions are suitable for their intended purposes, a need remains for a new type of solid ink that is capable of being printed via the piezoelectric ink jet printing process. There is further a need for ink compositions that can be processed at lower temperatures and with lower energy consumption, have improved robustness, have improved jetting reliability and latitude, and do not require an intermediate transfuse drum and high pressure fixing. In addition, a need remains for a new type of solid ink composition that exhibits desirably low viscosity values at jetting temperatures, generates images with improved look and feel characteristics, generates images with improved hardness and toughness characteristics, and that is suitable for a number of commonly used substrates. There is further a need for a solid ink composition that can ensure, to the extent that toxic or otherwise hazardous compounds are used in such compositions, that migration, evaporation or extraction of such materials from this new type of ink be controlled or ameliorated. When used in certain applications, for example food packaging, and direct to paper printing, it is desirable to reduce the amount of or eliminate altogether extractable species present, for example to meet environmental, health and safety requirements. There is also a need for solid inks that can be jetted at temperatures below those required for conventional solid inks—in some specific embodiments 10, 20, 30° C., or more below conventional jetting temperatures. Further, there is a need for solid inks that exhibit low shrinkage upon cooling from the melt. Additionally, there is a need for solid inks that exhibit little or no odor. A need also remains for solid inks that can be transfused at temperatures of about 70° C. or lower. A need also remains for solid inks with improved lightfastness.

SUMMARY

Disclosed herein is a radiation curable solid ink composition comprising: (a) a curable wax; (b) at least one curable monomer, oligomer, or prepolymer; (c) at least one photoinitiator; and (d) a pigment colorant; wherein the ink is a solid at a first temperature of about 25° C. or lower; and wherein the ink is a liquid at a second temperature of about 40° C. or higher; the ink being curable by free-radical polymerization. Also disclosed herein is a process which comprises: (1) incorporating into an ink jet printing apparatus a radiation curable solid ink composition comprising: (a) a curable wax; (b) at least one curable monomer, oligomer, or prepolymer; (c) at least one photoinitiator; and (d) a pigment colorant; wherein the ink is a solid at a first temperature of about 25° C. or lower; and wherein the ink is a liquid at a second temperature of about 40° C. or higher; the ink being curable by free-radical polymerization; (2) melting the ink; (3) causing droplets of the melted ink to be ejected in an imagewise pattern onto a substrate; and (4) exposing the imagewise pattern to ultraviolet radiation. Further disclosed herein is a curable solid ink jet ink stick or pellet which comprises a radiation curable solid ink composition comprising: (a) a curable wax; (b) at least one curable monomer, oligomer, or prepolymer; (c) at least one photoinitiator; and (d) a pigment colorant; wherein the ink is a solid at a first temperature of about 25° C. or lower; and wherein the ink is a liquid at a second temperature of about 40° C. or higher; the ink being curable by free-radical polymerization.

BRIEF DESCRIPTION OF THE DRAWING

FIG. 1 is a plot of complex viscosity versus temperature for the ink of Example III.

DETAILED DESCRIPTION

A radiation curable solid ink composition is described which can meet the challenges of printing direct to substrate while also enhancing smear resistance. In embodiments, the present curable solid inks retain the advantages of handling, safety, and print quality usually associated with solid phase change inks while providing additional breakthrough performance-enabling characteristics such as: jettability at temperatures of less than about 100° C., little shrinkage with temperature change, flexibility in design allowing for quick adaptability to application requirements and market needs, for example, ability to achieve gloss variation, hardness tuning, adhesion tuning, no post fusing/glossing step required for many applications, superior hardness compared to previously available wax based inks, no smear, and recyclability of prints.

In some embodiments, a radiation-curable solid ink composition is provided comprising at least one curable wax that is curable by free radical polymerization; at least one monomer, oligomer, or prepolymer; optionally at least one non-curable wax; at least one free-radical photoinitiator or photoinitiating moiety; and at least one colorant; wherein the components form a curable ink composition that is a solid at a first temperature of from about 20 to about 25° C.; and wherein the components form a liquid composition at a second temperature of greater than about 40° C., in embodiments from greater than about 40 to about 95° C., from about 45 to about 80° C., or from about 50 to about 60° C. In other embodiments, the present curable solid ink compositions comprise blends of waxes, resins, monomers, curable waxes and free-radical photoinitiators, all of which are free of liquid components at room temperature and have little or no odor below about 40° C. In further embodiments, a radiation curable solid ink composition herein comprises a curable wax that is curable by free radical polymerization; a monomer or oligomer, optionally a non-curable wax; a free-radical photoinitiator; and a colorant; wherein the curable wax, the monomer or oligomer, the optional non-curable wax, and the free-radical photoinitiator are solid at room temperature of about 20 to about 25° C.

The components enable jetting at temperatures in the range of about 70 to about 100° C. It was found, unexpectedly, that while the present inks can be formulated with a pre-cure hardness in the range of about 5 to about 50 at room temperature (about 25° C.) (solid ink hardness is typically about 67), the present curable solid ink compositions can be photochemically cured with high efficiency even at room temperature to form images with excellent smear resistance and with a hardness after cure that is greater than currently available solid inks. The combination of properties enables the present curable solid ink compositions to play an enabling role in existing and/or new applications and printing systems.

The curable wax herein can be any suitable curable wax that is curable by free radical polymerization. Examples of suitable curable waxes include those that are functionalized with curable groups. The curable groups can include, but are not limited to, acrylate, methacrylate, alkene, alkyne, vinyl, and allylic ether. In embodiments, the radiation curable solid ink composition contains at least one curable wax and the at least one curable wax contains an acrylate, methacrylate, alkene, vinyl, or allylic ether functional group. These waxes can be synthesized by the reaction of a wax equipped with a transformable functional group, such as carboxylic acid or hydroxyl.

Suitable examples of hydroxyl-terminated polyethylene waxes that can be functionalized with a curable group include, but are not limited to, mixtures of carbon chains with the structure $CH_3-(CH_2)_n-CH_2OH$, where there is a mixture of chain lengths, n, where the average chain length is in selected embodiments in the range of about 16 to about 50, and linear low molecular weight polyethylene, of similar average chain length, i.e. $CH_3-(CH_2)_n-CH_3$. Suitable examples of such waxes include, but are not limited to, UNILIN® 350, UNILIN® 425, UNILIN® 550, and UNILIN® 700 with Mn approximately equal to 375, 460, 550, and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

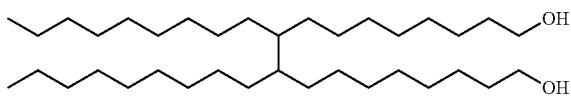

as well as other branched isomers which can include unsaturations and cyclic groups, available from Uniqema, New Castle, Del. Further information on C36 dimer diols is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that can be functionalized with a curable group include, but are not limited to, mixtures of carbon chains with the structure $CH_3—(CH_2)_n—COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550, and UNICID® 700 with Mn equal to approximately 390, 475, 565, and 720 g/mol, respectively. Other suitable waxes have a structure $CH_3—(CH_2)_n—COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

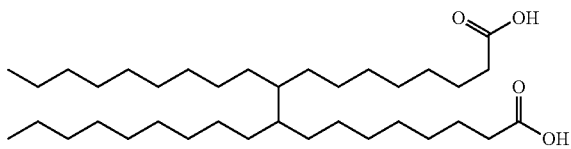

as well as other branched isomers which can include unsaturations and cyclic groups, available from Uniqema, New Castle, Del., can also be used. These carboxylic acids can be reacted with alcohols equipped with UV curable moieties to form reactive esters. Examples of these alcohols include, but are not limited to, 2-allyloxyethanol from Sigma-Aldrich Co.;

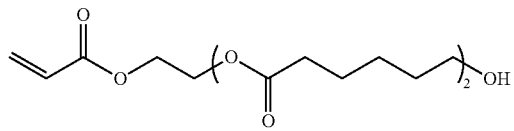

SR495B® from Sartomer Company, Inc., Exeter, Pa.; TONE® M-101 (R=H, $n_{avg}$=1), TONE® M-100 (R=H, $n_{avg}$=2) and TONE® M-201 (R=Me, $n_{avg}$=1) from Dow Chemical Company; and

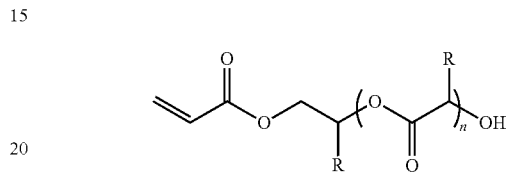

CD572® (R=H, n=10) and SR604® (R=Me, n=4) from Sartomer Company, Inc.

In one specific embodiment, the curable wax is a curable acrylate wax having a melting point of from about 50 to about 60° C. In another specific embodiment, the curable wax is Unilin® 350 acrylate, a curable acrylate wax (C22, C23, C24 mixture, melting point about 50 to about 60° C.) available from Baker Hughes, Incorporated, PP-U350a-1®, a curable polypropylene wax available from Clariant, or a combination thereof. Synthesis of UNILIN® 350 curable acrylate wax, having a number average molecular weight of about 375 g/mol, is described in U.S. Pat. No. 7,559,639, which is hereby incorporated by reference herein in its entirety.

The curable wax can be present in the ink in any suitable amount. In embodiments, the curable wax can be present in an amount of from about 1 to about 40%, or from about 2 to about 30%, or from about 3 to about 20%, by weight based upon the total weight of the curable solid ink composition, although the amounts can be outside of these ranges.

The radiation curable solid ink compositions disclosed herein can comprise any suitable curable monomer, oligomer, or prepolymer that is a solid at room temperature. Examples of suitable materials include radically curable monomer compounds, such as acrylate and methacrylate monomer compounds, which are suitable for use as phase change ink carriers. In embodiments, the at least one monomer, oligomer, or prepolymer is an acrylate monomer, a methacrylate monomer, a multifunctional acrylate monomer, a multifunctional methacrylate monomer, or a mixture or combination thereof.

Specific examples of relatively nonpolar solid acrylate and methacrylate monomers include (but are not limited to) lauryl acrylate, lauryl methacrylate, isodecylacrylate, isodecylmethacrylate, octadecylacrylate, behenyl acrylate, cyclohexane dimethanol diacrylate, and the like, as well as mixtures and combinations thereof.

Specific examples of nonpolar liquid acrylate and methacrylate monomers include (but are not limited to) isobornyl acrylate, isobornyl methacrylate, caprolactone acrylate, 2-phenoxyethyl acrylate, isooctylacrylate, isooctylmethacrylate, butyl acrylate, and the like, as well as mixtures and combinations thereof. In embodiments, the radiation curable solid ink composition herein further comprises at least one monomer, oligomer, or prepolymer that is a nonpolar liquid acrylate or methacrylate monomer selected from the group consisting of isobornyl acrylate, isobornyl methacrylate, caprolactone acrylate, 2-phenoxyethyl acrylate, isooctylacrylate, isooctylmethacrylate, butyl acrylate, or a mixture or combination thereof.

In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, diethylene glycol diacrylate, triethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl)isocyanurate triacrylate, propoxylated neopentyl glycol diacrylate (available from Sartomer Co. Inc. as SR 9003®), hexanediol diacrylate, tripropylene glycol diacrylate, dipropylene glycol diacrylate, alkoxylated neopentyl glycol diacrylate, isodecyl acrylate, tridecyl acrylate, isobornyl acrylate, isobornyl methacrylate, amine modified polyether acrylates (available as PO 83 F®, LR 8869®, and/or LR 8889® (all available from BASF Corporation), trimethylolpropane triacrylate, glycerol propoxylate triacrylate, propoxylated trimethylolpropane triacrylate, dipentaerythritol pentaacrylate, ethoxylated pentaerythritol tetraacrylate, propoxylated glycerol triacrylate, lauryl acrylate, lauryl methacrylate, dipentaerythritol hexaacrylate, ethoxylated pentaerythritol tetraacrylate (available from Sartomer Co. Inc. as SR 494®), ethoxylated trimethylolpropane triacrylate, di-trimethylolpropane tetraacrylate, neopentyl glycol propoxylate methylether monoacrylate, isodecylmethacrylate, caprolactone acrylate, 2-phenoxyethyl acrylate, isooctylacrylate, isooctylmethacrylate, butyl acrylate, and the like, as well as mixtures and combinations thereof.

The monomer, oligomer, prepolymer, reactive diluent, or combination thereof, can be present in any suitable amount. In embodiments, the monomer, oligomer, prepolymer, reactive diluent, or combination thereof is present in an amount of from about 1 to about 80%, or from about 30 to about 70%, or from about 35 to about 60%, by weight based on the total weight of the curable solid ink composition, although the amount can be outside of these ranges.

In one specific embodiment, the at least one monomer, oligomer, or prepolymer is a difunctional cycloaliphatic acrylate monomer, a trifunctional monomer, an acrylate ester, or a mixture or combination thereof. In another specific embodiment, the monomer can be CD-406®, a difunctional cycloaliphatic acrylate monomer (cyclohexane dimethanol diacrylate, melting point about 78° C.) available from Sartomer Company, Inc., SR368®, a trifunctional monomer (tris (2-hydroxy ethyl)isocyanurate triacrylate, melting point about 50 to about 55° C.) available from Sartomer Company, Inc., CD587® an acrylate ester (melting point about 55° C.) Sartomer Company, Inc., or a mixture or combination thereof.

In some embodiments, the curable solid ink composition further comprises a curable oligomer. Suitable curable oligomers include, but are not limited to, acrylated polyesters, acrylated polyethers, acrylated epoxies, urethane acrylates, and pentaerythritol tetraacrylates. Specific examples of suitable acrylated oligomers include, but are not limited to, acrylated polyester oligomers, such as CN2255®, CN2256® (Sartomer Co.), and the like, acrylated urethane oligomers, acrylated epoxy oligomers, such as CN2204®, CN110® (Sartomer Co.), and the like; and mixtures and combinations thereof.

In another embodiment, the radiation curable solid ink composition comprises at least one monomer, oligomer, or prepolymer having a melting point of from about 45 to about 80° C.

The curable oligomer can be present in any suitable amount, such as from about 0.1 to about 15% or from about 0.5 to about 10%, or from about 1 to about 5% by weight based upon the total weight of the curable solid ink composition.

In one embodiment, the ink carrier is substantially free of non-curable components. The ink carrier in the present disclosure is that portion of the ink other than the colorant, the colorant dispersant, and any antioxidants or similar additives. By "substantially free" is meant that the ink carrier in one specific embodiment contains no more than about 5 percent by weight non-curable components, in another embodiment no more than about 3 percent by weight non-curable components, and in yet another embodiment no more than about 0.3 percent by weight non-curable components, although the amount can be outside of these ranges.

Optionally, the ink can contain a non-curable wax. The non-curable wax herein can be any suitable non-curable wax component that is a solid at room temperature. By non-curable component, it is meant that the component does not react via free radical polymerization or is not radiation curable or not significantly radiation curable. In embodiments, the non-curable wax can be a member of the group consisting of acid waxes esterified with mono or polyvalent alcohols or blends of acid waxes having different degrees of esterification, and combinations thereof.

In one embodiment, the non-curable wax is an ester wax. In another embodiment, the non-curable wax is a derivative of montan wax. In a specific embodiment, the non-curable wax can be LicoWax® KFO, an ester wax available from Clariant.

In embodiments, the compositions contain a curable wax in combination with an ester wax wherein the ester wax has an acid value (mg KOH/g) that is greater than from about 15 to less than about 100, or from about 40 to about 95. Acid value can be measured by methods known to one of skill in the art, such as ASTM standard test method ASTM D 974.

In embodiments, the radiation curable solid ink composition contains a non-curable wax comprising an ester wax having a melting point of from about 40 to about 95° C.

In another embodiment, the non-curable wax is an ethoxylated octylphenol derivative which is soluble in the ink composition and/or which has a melting point of from about 5° C. to about 10° C. below jetting temperatures (which can range from about 70° C. to about 100° C.) so that the non-curable waxes homogenously combine with the other components of the ink composition. Furthermore, the molecular weight (MW) of ethoxylated octylphenol derivatives can range from about 600 to about 5000 g/mole. The term "ethoxylated octylphenol derivatives" also refers, for example, to those described in shown in Copending U.S. application Ser. No. 12/704,194, filed Feb. 11, 2010, the disclosure of which is totally incorporated herein by reference, and can be prepared by any desired or suitable method. In embodiments, the derivatives can be prepared as described in Copending U.S. application Ser. No. 12/704,194.

Specific examples of ethoxylated octylphenol derivatives herein include those of the formula

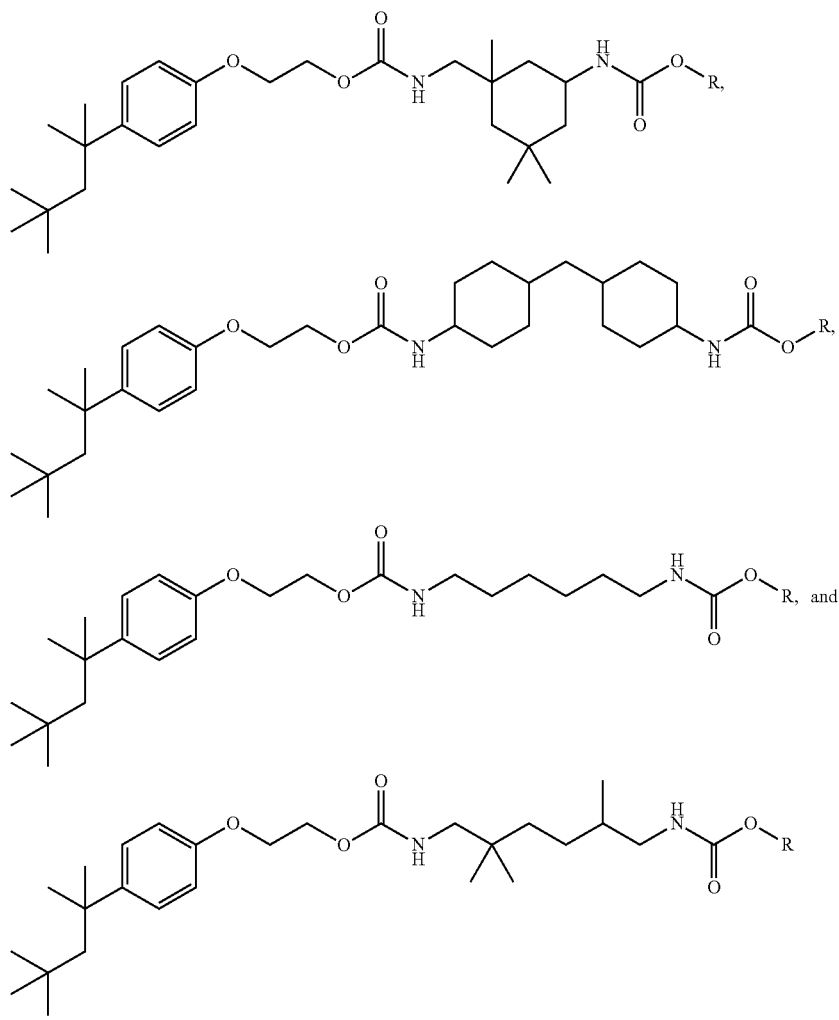

wherein R is $CH_3$—$(CH_2)_n$ and n is an integer of from about 23 to about 33, or from about 27 to about 29.

Reactants for the ethoxylated octylphenol derivatives can be selected from the TRITON® and IGEPAL® CA series based on octyl phenol ethoxylates, such as IGEPAL® CA-210 (equivalent to TRITON® X-15), IGEPAL® CA-420 (equivalent to TRITON® X-35), IGEPAL® CA-510 (equivalent to TRITON® X-45) IGEPAL® CA-620 (equivalent to TRITON® X-114), IGEPAL® CA-630 (equivalent to TRITON® X-100), IGEPAL® CA-720 (equivalent to TRITON® X-102, IGEPAL® CA-887 (equivalent to TRITON® X-305) IGEPAL® CA-890 (equivalent to TRITON® X-405), IGEPAL® CA-897 (equivalent to TRITON® X705), as well as the IGEPAL® CO series (based on nonylphenol ethoxylation), such as IGEPAL® CO210, CO520, CO630, CO720, and CO890, and IGEPAL® DM970 based on dinonylphenol ethoxylates.

The ethoxylated octylphenol derivatives can be prepared by mixing specific reactive components, for example, an ethoxylated octylphenol, a linear alcohol, and a diisocyanate and/or a polyisocyanate. These reactive components can include a linear alcohol having 28 or 30 carbons (sold under the trade name UNILIN® 425); ethoxylated octylphenols, such as IGEPAL® CA-210, IGEPAL® CA-420, IGEPAL® CA-520, IGEPAL® CA-620, IGEPAL® CA-630, and IGEPAL® CA-720 (ethoxylated octylphenols sold under the trade name IGEPAL®; formerly manufactured by Rhone-Poulenc Co. and currently manufactured by Rhodia; the TRITON® Series, formerly manufactured by Union Carbide and currently manufactured by Dow Chemical Company); diisocyanates and polyisocyanates, including aromatic, aliphatic, cycloaliphatic and/or (cyclo)aliphatic diisocyanates and/or polyisocyanates. Suitable aliphatic diisocyanates or polyisocyanates may have from about 3 to about 16 carbon atoms or from about 4 to about 12 carbon atoms, in the linear or branched alkyl portion, and suitable cycloaliphatic or (cyclo) aliphatic diisocyanates may possess from about 4 to about 18 carbon atoms or from about 6 to about 15 carbon atoms, in the cycloalkyl portion. The term "(cyclo)aliphatic diisocyanates" refers, for example, to NCO groups that are attached cyclically and aliphatically at the same time (such as isophorone diisocyanate); and cycloaliphatic diisocyanates include those which contain only NCO groups attached directly to the cycloaliphatic ring, such as $H_{12}MDI$.

Suitable diisocyanates and polyisocyanates include, for example, isophorone diisocyanate (IPDI); diisocyanatodicyclohexylmethane ($H_{12}MDI$); hexamethylene diisocyanate (HDI); 2,2,4-trimethylhexamethylene diisocyanate/2,4,4-trimethylhexamethylene diisocyanate (TM-HDI); 2-methylpentane diisocyanate (MPDI); norbornane diisocyanate (NBDI); phenylene 1,3- and 1,4-diisocyanate; naphthylene 1,5-diisocyanate; tolidine diisocyanate; tolylene 2,6-diisocyanate; tolylene 2,4-diisocyanate (2,4-TDI); diphenylmethane 2,4'-diisocyanate (2,4'-MDI); diphenylmethane 4,4'-diisocyanate; the mixtures of monomeric diphenylmethane diisocyanates (MDI) and oligomeric diphenylmethane diisocyanates (polymer MDI); xylylene diisocyanate; tetramethylxylylene diisocyanate (TMXDI); triisocyanatotoluene; cyclohexane diisocyanate; methylcyclohexane diisocyanate; ethylcyclohexane diisocyanate; propylcyclohexane diisocyanate; methyldiethylcyclohexane diisocyanate; propane diisocyanate; butane diisocyanate; pentane diisocyanate; hexane diisocyanate; heptane diisocyanate; octane diisocyanate, nonane diisocyanate; nonane triisocyanate, such as 4-isocyanatomethyloctane 1,8-diisocyanate (TIN); decane diisocyanate and triisocyanate; undecane diisocyanate and triisocyanate; dodecane diisocyanates and triisocyanates; 4-methylcyclohexane 1,3-diisocyanate; 2-butyl-2-ethylpentamethylene diisocyanate; 3(4)-isocyanatomethyl-1-methylcyclohexyl isocyanate; 2-isocyanatopropylcyclohexyl isocyanate; methylenebis-(cyclohexyl) 2,4'-diisocyanate; 1,4-diisocyanato-4-methylpentane; and mixtures thereof.

The non-curable wax can be present in any suitable amount. In embodiments, the non-curable wax can be present in an amount of from about 1 to about 55%, or from about 5 to about 50%, or from about 10 to about 45%, by weight based upon the total weight of the curable solid overcoat composition. In one embodiment, the non curable wax can be present in an amount of from about 20 to about 50% by weight, based upon the total weight of the curable solid ink composition.

In embodiments, the radiation curable solid ink compositions herein are free of (that is, do not contain) any liquid components at room temperature. In other embodiments, the radiation curable solid ink compositions herein comprise at least one curable wax that is curable by free radical polymerization; at least one monomer, oligomer, or prepolymer; at least one non-curable wax; at least one free-radical photoinitiator or photoinitiating moiety, wherein the final composition is solid at room temperature of about 20 to about 25° C.

In embodiments, the radiation curable solid ink composition forms a semi-solid state at an intermediate temperature between a jetting temperature and a substrate temperature and wherein the radiation curable solid ink composition remains in a liquid or semi-solid state for a period of time prior to solidification on the substrate. In other embodiments, the radiation curable solid ink compositions herein are slow to solidify when cooling from the melt temperature, thus forming a semi-solid state at an intermediate temperature between the jetting temperature and the substrate temperature thus enabling controlled spreading or pressure fusing of the compositions upon printing. In certain embodiments, a component rate of crystallization or solidification can be altered in a mixture thus providing conditions where the radiation curable solid ink composition remains in a liquid or semi-solid state for a period of time prior to solidification, thereby providing a solid ink that can be melted so as to enable jetting, having a slow crystallization rate such that the ink remains in a semi-solid state on the paper thereby positively affecting curing performance.

Without wishing to be bound by theory, it is believed that the inclusion of the ester wax selected herein provides the radiation curable solid ink composition with the ability to form an ink that is both hard at room temperature and exhibits good curing.

Further, it was unexpectedly found that blends of monofunctional, difunctional, and multifunctional acrylated long chain aliphatics, cycloaliphatic acrylate, and/or reactive isocyanurate derivatives, of molecular weight ranging from about 200 to about 500 g/mole in combination with at least one component comprising a curable wax of molecular weight from about 300 to about 5,000 g/mole, enable achievement of improved smear resistance as observed in a "thumb twist" test, reduced offset in document offset tests, and good cure even in the absence of an amine synergist.

Radiation curable as used herein is intended to cover all forms of curing upon exposure to a radiation source, including light and heat sources and including in the presence or absence of initiators. Examples of radiation curing routes include, but are not limited to, curing using ultraviolet (UV) light, for example having a wavelength of from about 200 to about 400 nanometers, or more rarely visible light, in one embodiment in the presence of photoinitiators and/or sensitizers, curing using e-beam radiation, in embodiments in the absence of photoinitiators, curing using thermal curing, in the presence or absence of high temperature thermal initiators (and which are in embodiments largely inactive at the jetting temperature), and appropriate combinations thereof.

In embodiments, the curable solid ink composition comprises a photoinitiator that initiates polymerization of curable components of the ink, including the curable monomer and the curable wax. The initiator in one embodiment is solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, but are not limited to, ketones such as benzyl ketones, monomeric hydroxyl ketones, polymeric hydroxyl ketones, benzoin ethers, benzil ketals, α-hydroxyalkylphenones, α-alkoxyalkylphenones, α-aminoalkylphenones, and α-amino ketones; acyl phosphines and acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. A specific ketone is 1-[4-(2-hydroxyethoxy)-phenyl]-2-hydroxy-2-methyl-1-propane-1-one. In a specific embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. Other specific examples are 2,4,6-trimethylbenzoyldiphenylphosphine oxide, commercially available as BASF LUCIRIN TPO, 2,4,6-trimethylbenzoylethoxyphenylphosphine oxide, commercially available as BASF LUCIRIN TPO-L, 2-isopropylthioxanthone, available as DAROCUR ITX from Ciba, and the like. In one specific embodiment, the photoinitiator comprises a mixture of 2-isopropylthioxanthone and 2-isopropylthioxanthone, 2-methyl-1[4-(methylthio)phenyl]-2-morpholinopropan-1-one, or a mixture or combination thereof.

In another specific embodiment, the curable solid ink composition comprises a three-component photoinitiator system with no synergist. U.S. Pat. No. 6,896,937, the disclosure of which is totally incorporated herein by reference, discloses a radiation-curable hot melt ink composition comprising a colorant, a polymerizable monomer, and a photoinitiating system comprising 0.5 to 1.5% by weight of an aromatic ketone photoinitiator, 2 to 10% by weight of an amine synergist, 3 to 8% by weight of a second photoinitiator that is different than the aromatic ketone photoinitiator and capable of undergoing alpha cleavage, and 0.5 to 1.5% by weight of a photosensitizer. U.S. Pat. No. 6,896,937 also discloses liquid curable ink compositions and compositions with liquid diluents, which inks are not solids at room temperature. U.S. Pat. No. 7,322,688, the disclosure of which is totally incorporated herein by reference, discloses a method of inkjet printing curable inks which inks are polymerized by a cationic photoinitiating system. In embodiments, the curable solid ink composition comprises a photoinitiator that initiates polymerization of curable components of the ink, including the curable monomer and the curable wax. In an embodiment, the initiator is solid at room temperature and soluble in the composition at jetting temperature. In specific embodiments, the initiator is an ultraviolet radiation activated photoinitiator.

In embodiments, the initiator is a radical initiator. Examples of suitable radical photoinitiators include, for example, ketones such as benzyl ketones, monomeric hydroxyl ketones, polymeric hydroxyl ketones, and α-amino ketones; acyl phosphine oxides, metallocenes, benzophenones and benzophenone derivatives, such as 2,4,6-trimethylbenzophenone and 4-methylbenzophenone; and thioxanthenones, such as 2-isopropyl-9H-thioxanthen-9-one. An exemplary ketone is 1-[4-(2-hydroxyethoxy)-phenyl]-2-hydroxy-2-methyl-1-propane-1-one. In an embodiment, the ink contains an α-amino ketone, 1-[4-(2-hydroxyethoxy)-phenyl]-2-hydroxy-2-methyl-1-propane-1-one and 2-isopropyl-9H-thioxanthen-9-one. In a specific embodiment, the photoinitiator comprises 2-isopropylthioxanthone and 2-isopropylthioxanthone, 2-methyl-1[4-(methylthio)phenyl]-2-morpholinopropan-1-one, or a mixture or combination thereof.

In specific embodiments, the curable solid inks herein also include photoinitiators, such as α-hydroxyketone photoinitiators (including α-hydroxyketone photoinitiators sold under the trade name IRGACURE® 184, IRGACURE® 500, DAROCUR® 1173, and IRGACURE® 2959, which are manufactured by Ciba Special Chemicals), α-aminoketone photoinitiators (including α-aminoketone photoinitiators IRGACURE® 369, IRGACURE® 379, IRGACURE® 907, and IRGACURE® 1300, which are manufactured by Ciba Special Chemicals), and bisacyl phosphine photoinitiators (including bisacyl phospine photoinitiators sold under the trade name IRGACURE® 819, IRGACURE® 819DW, and IRGACURE® 2022, which are manufactured by Ciba Special Chemicals). Other suitable photoinitiators include monoacylphosphine oxide and bisacylphosphine oxide, such as 2,4,6-trimethylbenzoybiphenylphosphine oxide (manufactured by BASF under the trade name LUCIRIN® TPO); ethyl-2,4,6-trimethylbenzoylphenyl phosphinate (manufactured by BASF under the tradename LUCIRIN® TPO-L); mono- and bis-acylphosphine photoinitiators (such IRGACURE® 1700, IRGACURE® 1800, IRGACURE® 1850, and DAROCUR® 4265, manufactured by Ciba Specialty Chemicals), and benzyldimethyl-ketal photoinitiators (such as IRGACURE® 651, manufactured by Ciba Specialty Chemicals).

Known curable ink carriers have been found to be a liquid, a gel, or a very soft solid at room temperature, for example having a hardness of less than about 11. Efforts of the present applicants to improve hardness based on the recommended components disclosed by U.S. Pat. Nos. 6,896,937 and 7,322,688 were unsuccessful. Removing the liquid amine synergist (in contrast to U.S. Pat. No. 6,896,937, which teaches including an amine synergist) increased the initial hardness to about 18 for inks containing an adjuvant, hydroxyl stearic acid, but it also significantly affected the hardness after cure, the hardness being reduced from about 80 or 85 to about 66, which is less than the hardness value of 67 achieved with current solid inks. This data indicated that it would not be possible to obtain good cure either when an adjuvant was used or when hardness before cure was as high as 18, despite the fact that it has been described that adjuvants can optionally be added to curable phase change inks.

In other embodiments, the initiator is a cationic initiator. Examples of suitable cationic photoinitiators include, but are not limited to, aryldiazonium salts, diaryliodonium salts, triarysulfonium salts, triarylselenonium salts, dialkylphenacylsulfonium salts, triarylsulphoxonium salts, and aryloxydiarylsulfonium salts.

The initiator can be present in any effective amount. In one embodiment, the initiator is present in an amount of from about 0.5 to about 15%, and in another embodiment from about 1 to about 10%, by weight based upon the total weight of the curable solid ink composition.

Any desired or effective colorant can be employed in the inks, including dyes, pigments, mixtures thereof, and the like, provided that the colorant can be dissolved or dispersed in the ink carrier. The compositions can be used in combination with conventional ink colorant materials, such as Color Index (C.I.) Solvent Dyes, Disperse Dyes, modified Acid and Direct Dyes, Basic Dyes, Sulfur Dyes, Vat Dyes, and the like.

In embodiments, the colorant comprises a dye, a pigment, a curable olefin colorant, or a mixture thereof. Examples of suitable dyes include, but are not limited to, Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF, available from Clariant; Carta Blue 2GL, available from Clariant; solvent dyes, including spirit soluble dyes such as Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF); Neozapon Black X51 [C.I. Solvent Black, C.I. 12195] (BASF); Sudan Blue 670 [C.I. 61554] (BASF); Sudan Yellow 146 [C.I. 12700] (BASF); Sudan Red 462 [C.I. 260501] (BASF); and the like, as well as mixtures thereof.

In embodiments, the colorant is a pigment. Examples of suitable pigments include PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical); Hostaperm Blue B2G-D (Clariant); Permanent Red P-F7RK; Hostaperm Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical); PALIOGEN Red 3340 (BASF); SUNFAST® Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC® C Orange 16 (Sun Chemical); HELIOGEN Blue K6902, K6910 (BASF); SUNFAST® Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF);

LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow DI 355, DI 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Carbon Black 5250, Carbon Black 5750 (Columbia Chemical), and the like, as well as mixtures thereof.

In one specific embodiment, the colorant is Pigment Violet 19, available from Ciba Specialty Chemicals, Highpoint, N.C. as MICROLITH Jet Magenta 2B; Pigment Red 122, available from Sun Chemical Corporation, Cincinnati, Ohio as Quindo Magenta RV6822; Pigment Yellow 151, available from Ciba Chemicals, Highpoint, N.C. as MICROLITH Jet Yellow 4G; Pigment Yellow 155, available from Ciba Chemicals, Highpoint, N.C. as MICROLITH Yellow 4G-K; Pigment Red 48:2, available from Clariant, Charlotte, N.C. as Permanent Red LB01 VP2756; or a mixture of any two or more of these pigments.

The colorant is present in any desired or effective amount to obtain the desired color or hue, in one embodiment at least about 0.1 percent by weight of the ink, and in another embodiment at least about 0.2 percent by weight of the ink, and in one embodiment no more than about 15 percent by weight of the ink, and in another embodiment no more than about 8 percent by weight of the ink, although the amount can be outside of these ranges.

In some embodiments, the curable solid ink compositions include a dispersant. The dispersant can be any suitable or desired dispersant, including but not limited to AB-diblock copolymers of high molecular weight such as EFKA® 4340 available from Ciba Specialty Chemicals Inc. and DISPER-BYK® 2100 available from Byk Corp. or a mixture thereof. In a specific embodiment, the dispersant mixture comprises a cyclohexane dimethanol diacrylate (such as CD406® available from Sartomer Corporation) and at least one additional component, such as EFKA® 4340 is a high molecular weight dispersing agent having an AB-diblock copolymer structure available from Ciba Specialty Chemicals Inc. The pigment can be pre-dispersed in a compatible carrier resin to improve dispersibility.

The pigment dispersant can be present in the ink in any desired or effective amount, in one embodiment at least about 20 percent by weight of the pigment, and in one embodiment no more than about 200 percent by weight of the pigment, although the amount can be outside of these ranges.

The ink can contain optional additives. Optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. In particular, the composition can include, as a stabilizer, a radical scavenger, such as IRGASTAB® UV 10 (Ciba Specialty Chemicals, Inc.). The composition can also include an inhibitor, in one embodiment a hydroquinone, to stabilize the composition by prohibiting or, at least, delaying, polymerization of the oligomer and monomer components during storage, thus increasing the shelf life of the composition. However, additives can negatively affect cure rate, and thus care is to be taken when formulating a composition using optional additives.

Optional additives can be present in any suitable amount. The total amount of other additives can be in one specific embodiment at least about 0.1 percent by weight of the ink, and in another specific embodiment at least about 0.5 percent by weight of the ink, and in one embodiment no more than about 15 percent by weight of the ink, and in another embodiment no more than about 10 percent by weight of the ink, although the amount can be outside of these ranges.

The ink compositions can be prepared by any desired or suitable method. For example, in one specific embodiment, the ink can be prepared by a process for preparing a radiation curable solid ink composition wherein a solid pigment and dispersant are added to a molten solid monomer, the process comprising: (a) heating a monomer that is solid at room temperature to a temperature above the monomer melting point to provide a molten solid monomer; (b) adding a curable component, a non-curable component, and a photoinitiator to the molten solid monomer to provide a molten ink base; (c) adding a dispersant to the molten ink base; and (d) adding a pigment to the molten ink base with stirring to provide a curable pigmented ink composition. In another specific embodiment, the ink can be prepared by a process for preparing a radiation curable solid ink composition wherein a liquid pigment concentrate is added to an ink base, the process comprising: (a) providing a monomer that is liquid at room temperature; (b) adding a curable component, a non-curable component, and a photoinitiator to the liquid monomer to provide a liquid ink base; (c) preparing a liquid pigment concentrate comprising a pigment a liquid curable monomer, and a dispersant; and (d) combining the liquid pigment concentrate and the liquid ink base with stirring to provide a curable pigmented ink composition. In yet another specific embodiment, the ink can be prepared by a process for preparing a radiation curable solid ink composition wherein a solid pigment concentrate is added to an ink base, the process comprising: (a) adding a monomer that is solid at room temperature to a dispersant in solution; (b) treating the solution of step (a) to remove liquid to provide a solid comprising monomer and dispersant; (c) adding a pigment to the solid monomer and dispersant of (b) with heating and stirring to provide a solid pigment concentrate; and (d) combining the solid pigment concentrate and a curable solid ink base comprising a curable component, a non-curable component, and a photoinitiator with heating and stirring to provide a curable pigmented ink composition. Further details on these processes are disclosed in, for example, U.S. application Ser. No. 12/703,817, the disclosure of which is totally incorporated herein by reference.

In some embodiments, the pigment can be added to the molten ink base while homogenizing at a high rpm (revolutions per minute). As used herein, high rpm means, for example, an rpm of from about 1,000 to about 10,000, or from about 2,000 to about 3,000, for example, using a POLYTRON® Homogenizer, available from Metrohm USA, Inc.

In other embodiments, a liquid pigment concentrate is formed by mixing a pigment concentrate and dispersant in a liquid curable monomer using an attrition process; and in a second step, the concentrate is added to a molten ink base while homogenizing.

In yet other embodiments, a pigment concentrate in a solid curable monomer is prepared by an attrition process; the prepared pigment concentrate is added to an ink base; and the pigmented ink is melted and then mixed.

Treating the solution to remove liquid to provide a solid comprising monomer and dispersant can comprise any suitable or desired method to removed solvent from the solution. In embodiments, treating can comprise heating, evaporating, such as rotary evaporation, or a combination thereof, for a period of time sufficient to remove solvent and provide a solid monomer dispersant mixture.

Heating can be to any suitable or desired temperature, considerate of the monomers and other components selected. In embodiments, heating is to a temperature of about 30° C. to about 150° C., or from to a temperature of about 50° C. to about 70° C. In a specific embodiment, heating can be to a temperature of about 90° C.

Homogenizing can comprise mixing at any suitable or desired speed. As discussed above, homogenizing can comprise mixing at a high rpm, with high rpm meaning for example, an rpm of from about 1,000 to about 10,000, or from about 2,000 to about 3,000. In a specific embodiment, homogenizing can be at a speed of about 10,000 rpm.

Heating and homogenizing can be for any suitable or desired time, in embodiments for about 20 to about 120 minutes, or from about 30 to about 50 minutes.

In a specific embodiment, heating is to a temperature of about 90° C., mixing is done at a speed of about 10,000 rpm for a period of about 15 minutes.

In some embodiments, the liquid pigment concentrate and solid pigment concentrate processes herein provide an average pigment particle size (Z average particle size) of less than about 120 nanometers, thereby reducing or eliminating the need for additional homogenization time in the ink making step. For example, the average pigment particle size is from about 50 to about 150 nanometers, or from about 80 to about 100 nanometers.

Further, in embodiments, the pigment concentrates are stable and do not exhibit pigment aggregation upon aging or freeze-thaw cycles. In embodiments, even after six months of standing, the pigment concentrate can be used to form inks having excellent properties. Further, in embodiments, the processes provide curable solid pigmented inks having improved lightfast properties and that can be produced at lower cost.

In embodiments, the curable pigmented solid inks prepared by the processes described herein comprise ink formulations that enable printing at lower temperature (such as 70° C. to 100° C.) while achieving robustness performance that exceeds conventional solid wax-based inks. These low shrinkage curable solid inks can comprise blends of waxes, ethoxylated octylphenol derivative resins, monomers, curable waxes and free-radical photoinitiators, all of them being solid with little or no odor below about 40° C. These components can also be selected to enable the production of inks that are solids or pastes at a first temperature of from about 20° C. to about 25° C.; and wherein the components form a liquid composition at a second temperature of greater than about 40° C.

In embodiments, the components are solids or pastes at a first temperature of from about 20° C. to about 25° C., and form a liquid composition at a second temperature of about 40° C. to about 100° C., wherein at least about 99%, such as about 99.5%, of the components are in liquid form and do not thermally decompose into other products when heated to the second temperature within the range of about 40° C. to about 100° C., such as about 70° C. to about 100° C. In embodiments, the components are solids or pastes at a first temperature of from about 20° C. to about 25° C., and the components form a liquid composition at a second temperature of about 70° C. to about 100° C., wherein at least 99.9%, such as about 99.99%, of the components are in liquid form do not thermally decompose into other products when heated to the second temperature within the range of about 70° C. to about 100° C., such as about 75° C. to about 95° C.

Thus, the inks of the present disclosure can be jetted at temperatures in the range of about 70° C. to about 100° C., such as from about 75° C. to about 95° C. The robustness of these inks are independently controlled by photochemically curing them with high efficiency, efficiency being dependent on the chemistry of the formulation and the reactivity of the photoinitiating system, to form images with excellent smear resistance and with a hardness after cure greater than conventional solid inks (conventional solid ink hardness=about 67). The term high efficiency curing process refers, for example, to a curing process where the photoinitiator triggers a nearly instantaneous curing reaction upon exposure to the UV light—producing a completely polymerized inks in seconds or less of exposure.

The inks described herein can be applied to a substrate to form an image. In embodiments, the method comprises providing a curable solid ink composition described herein at a first temperature; applying, such as jetting, the radiation curable ink to the substrate in an imagewise fashion to form an image, the substrate being at a second temperature, which is below the first temperature; and exposing the radiation curable ink to radiation to cure the ink. During the curing process, the curable monomer and the curable wax, optionally with other curable components, such as the optional curable oligomer, are polymerized to form a cured image.

In a specific embodiment, the composition is applied by ink jet printing. The inks described herein are jetted in one embodiment at temperatures of about 50° C. to about 110° C. and in another embodiment at from about 60° C. to about 100° C., although the temperature can be outside of these ranges. The jetting temperature is maintained within the range of thermal stability of the composition to prevent premature polymerization in the printhead. At the jetting temperature, the inks have a viscosity in one embodiment of from about 5 mPa-s to about 25 mPa-s and in another embodiment of from about 10 mPa-s to about 12 mPa-s, although the viscosity can be outside of these ranges. The inks are thus ideally suited for use in piezoelectric ink jet devices.

However, the substrate to which the inks are applied could be at a temperature at which the ink has a higher viscosity, such as a viscosity in one specific embodiment of from about $10^2$ to about $10^7$ mPa-s. For example, the substrate can be maintained at a temperature of about 80° C. or below, more specifically in one embodiment from about 0° C. to 50° C., the temperature at the substrate being less than the jetting temperature. In a specific embodiment, the substrate temperature is at least about 10° C. below the first temperature, and in another embodiment the substrate temperature is from about 10 to about 50° C. below the jetting temperature.

By jetting the ink at a temperature at which the ink is a liquid and maintaining the substrate at the temperature at which the ink has a higher viscosity, a phase change can be effected. This phase change can prevent the composition from rapidly soaking into the substrate, thereby avoiding or at least minimizing showthrough. In addition, the ink while on the substrate is exposed to radiation to initiate polymerization of the curable monomer, leading to a robust image.

In specific embodiments, the curable solid ink compositions can be employed in apparatus for direct printing ink jet processes, wherein droplets of the melted ink are ejected in an imagewise pattern onto a recording substrate and the recording substrate is a final recording substrate, such as direct to paper applications, although the substrate is not limited to paper. The substrate can be any suitable material such as paper, boxboard, cardboard, fabric, transparency, plastic, glass, wood, or the like.

Alternatively, the inks can be employed in indirect (offset) printing ink jet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The inks disclosed herein have hardness values after curing, measured using a PTC® Durometer Model PS 6400-0-29001, available from Pacific Transducer Corp., Los Angeles, Calif. using a Model 476 Stand with standard 1 Kg load, of in one embodiment at least about 70, in another embodiment at least about 75, and in yet another embodiment at least about 80, although the value can be outside of these ranges.

The inks disclosed herein exhibit shrinkage values, measured by pouring about 6.7 milliliters of molten ink into a copper mold of 35 millimeters in diameter and 7 millimeters in height, leaving the ink to cool for a minimum of 12 hours, and determining the shrinkage from the diameter of the solidified ink and of the mold, making the assumption that that shrinkage in y- and x-direction (height) are the same, in one embodiment no more than about 10%, in another embodiment no more than about 5%, and in yet another embodiment no more than about 3%, although the value can be outside of these ranges.

The inks disclosed herein exhibit reactivity as defined by the robustness values, measured by MEK rub (see description below), of in one embodiment at least about 40, in another embodiment at least about 50, and in yet another embodiment at least about 75, although the values can be outside of these ranges.

After the curing step, the samples were tested for resistance to document offset and resistance to solvent via a procedure known as the MEK rub test as described by the ASTM D 5402-93 procedure available from the American Society for Testing and Materials (ASTM). The document offset test placed the test samples in an oven at 60° C. for 24 hours under an 80 g/cm$^2$ load. Images were then removed and peeled apart to determine if the ink was removed from the sample. A methyl ethyl ketone (MEK) rub test was also conducted on the cured images. The test consisted of measuring the number of times a cotton swab that had been soaked in MEK solvent could be rubbed across the image until the image was damaged. The MEK rub test is a semi-qualitative measurement of the robustness of ink prints, and a commonly used technique in the curable ink printing industry. The number of MEK rubs is only one of the measurements to determine the degree of cure of ink. However, if the ink was not removed after 150 rubs with the MEK, the test was stopped. The greater the number of MEK rubs, the greater the degree of cure.

The present disclosure is also directed to a printer containing the inks described herein. Specifically, the present disclosure relates to a printer cartridge containing the inks described herein, as well as to a printer containing the printer cartridge.

Specific embodiments will now be described in detail. These examples are intended to be illustrative, and the claims are not limited to the materials, conditions, or process parameters set forth in these embodiments. All parts and percentages are by weight unless otherwise indicated.

EXAMPLE I

Curable solid compositions were prepared by combining the components in Table 1 in the amounts listed. Inks were prepared by adding 2% by of a blue olefin dye (24316, obtained from Eastman Kodak Co., Rochester, N.Y.) to the curable solid compositions of Table 1, based on the total combined weight of the dye and curable solid composition components. An optimized curable solid ink composition was prepared as set forth in Table 2, wherein the inks were prepared in three batches for a total of 150 g. The components are as follows: CD406® is a difunctional cycloaliphatic acrylate monomer (cyclohexane dimethanol diacrylate, melting point about 78° C.) obtained from Sartomer Company, Inc., Exeter, Pa.; SR368® is a trifunctional monomer (tris(2-hydroxy ethyl)isocyanurate triacrylate, melting point about 50 to about 55° C.) obtained from Sartomer Company, Inc.; CD587® is an acrylate ester (melting point about 55° C.) obtained from Sartomer Company, Inc.; UNILIN® 350 acrylate is a curable acrylate wax obtained from Baker Petrolite, Sand Springs, Okla. (C22, C23, C24 mixture, melting point about 50 to about 60° C.). UNILIN® 350 can be used as received or synthesized as described in U.S. Pat. No. 7,559,639, which is hereby incorporated by reference herein in its entirety; CN2255® is a polyester acrylate oligomer, melting point about 53 to about 55° C., obtained from Sartomer Company, Inc.; CN2256® is a polyester acrylate oligomer, melting point about 56 to about 58° C., obtained from Sartomer Company, Inc.; LicoWax® KFO, drop melting point about 89° C., is an ester wax obtained from Clariant Canada, St-Laurent, Quebec; DAROCUR® ITX is a type II photoinitiator comprising a mixture of 2-isopropylthioxanthone and 2-isopropylthioxanthone, melting point 60 to 67° C., obtained from Ciba Specialty Chemicals, Basel, Switzerland; IRGACURE® 907 is an α-amino-ketone photoinitiator comprising 2-methyl-1[4-(methylthio)phenyl]-2-morpholinopropan-1-one, melting point 70 to 75° C., obtained from Ciba Specialty Chemicals; IRGACURE® 819 is a bis acyl phosphine photoinitiator comprising bis(2,4,6-trimethyl benzoyl)-phenylphosphineoxide, melting point 127 to 133° C., obtained from Ciba Specialty Chemicals; IRGACURE® 184 is an α-hydroxy ketone photoinitiator comprising 1-hydroxy-cyclohexyl-phenyl-ketone, melting point 45 to 49° C., obtained from Ciba Specialty Chemicals.

Pre- and post-cure hardness measurements for Examples 1-9 were obtained using a PTC® Durometer, Model PS 6400-0-29001, obtained from Pacific Transducer Corporation, Los Angeles, Calif. using a Model 476 Stand with standard 1 Kg load. In comparison to the present examples, the hardness of a commercially available ColorQube™ 9200 Series conventional solid ink 67.

The cure rate was obtained by measuring the variation of hardness versus ultraviolet light exposure. A Fusion UV Systems LIGHTHAMMER®, obtained from Fusion UV Systems, Inc., Gaithersburg, Md. equipped with a D-bulb was used to irradiate the ink compositions of Examples 1-9 and hardness was measured after specific exposure times. The hardness versus cure speed (s/ft) plot was used to obtain the initial curing rate for the ink carrier.

TABLE 1

| | Example | | | | | | | | |
|---|---|---|---|---|---|---|---|---|---|
| | 1 | 2 | 3 | 4 | 5 | 6 | 7 | 8 | 9 |
| Monomer | | | | | | | | | |
| CD406 ® | 2.00 | 2.00 | 2.00 | 2.00 | 2.9 | 2.00 | 2.00 | 2.01 | 2.08 |
| SR368 ® | 1.02 | 1.02 | 1.02 | 1.02 | 1.6 | 1.02 | 1.02 | 1.04 | 1.04 |
| CD587 ® | 3.04 | 3.04 | 3.04 | 3.03 | 2.57 | 3.04 | 3.04 | 3.05 | 2.93 |
| Curable Wax | | | | | | | | | |
| Unilin ® 350 Acrylate* | 0.81 | 0.81 | 0.81 | 0.81 | 0.37 | 0.81 | 0.81 | 0.81 | 0.85 |
| Oligomer | | | | | | | | | |
| CN2255 ® | 0 | 0 | 0 | 0 | 0 | 0.08 | 0 | 0 | 0 |
| CN2256 ® | 0 | 0 | 0 | 0 | 0 | 0 | 0.08 | 0 | 0 |
| Non-curable Wax | | | | | | | | | |
| LicoWax ® KFO | 2.57 | 2.57 | 2.57 | 2.58 | 2 | 2.49 | 2.49 | 2.58 | 2.61 |
| Photoinitiator | | | | | | | | | |
| Darocur ® ITX | 0.05 | 0.05 | 0.05 | 0.05 | 0.05 | 0.05 | 0.05 | 0 | 0 |
| Irgacure ® 907 | 0.51 | 0.51 | 0.51 | 0.51 | 0.51 | 0.51 | 0.51 | 0.51 | 0.1 |
| Irgacure ® 819 | 0 | 0 | 0 | 0 | 0 | 0 | 0 | 0 | 0.16 |
| Irgacure ® 184 | 0 | 0 | 0 | 0 | 0 | 0 | 0 | 0 | 0.23 |
| Total | 10.00 | 10.00 | 10.00 | 10.00 | 10.00 | 10.00 | 10.00 | 10.00 | 10.00 |
| Hardness Before Cure | 37.3 | 36.8 | 32.9 | 37.0 | 28.7 | 36.7 | 35.5 | 35.5 | 31.3 |
| Hardness After Cure | 73.3 | 76.3 | 74.4 | 74.9 | 76.0 | 75.3 | 75.6 | 77.1 | 77.8 |
| Initial Cure Rate (ft/s)† | 29.0 | 30.1 | 34.8 | 30.6 | 46.5 | 36.0 | 37.0 | 41.6 | 122.3 |

*Prepared as described in U.S. Pat. No. 7,559,639.
†ft/s = feet per second

TABLE 2

Optimized Curable Solid Ink

| | L1a | L1b | L1c | SUM | Weight % |
|---|---|---|---|---|---|
| Monomer | | | | | |
| CD406 ® | 12.24 | 12.24 | 6.12 | 30.59 | 20.39 |
| SR368 ® | 6.10 | 6.10 | 3.05 | 15.26 | 10.17 |
| CD587 ® | 17.23 | 17.23 | 8.62 | 43.09 | 28.72 |
| Curable Wax | | | | | |
| Unilin ® 350 Acrylate* | 5.00 | 5.00 | 2.50 | 12.49 | 8.33 |
| Non-curable Wax | | | | | |
| LicoWax ® KFO | 15.32 | 15.32 | 7.66 | 38.31 | 25.54 |
| Photoinitiator | | | | | |
| Irgacure ® 819 | 0.94 | 0.94 | 0.47 | 2.35 | 1.57 |
| Irgacure ® 184 | 1.35 | 1.35 | 0.68 | 3.39 | 2.26 |
| Irgacure ® 907 | 0.61 | 0.61 | 0.30 | 1.52 | 1.01 |
| Colorant | | | | | |
| Blue Olefin Dye | 1.20 | 1.20 | 0.60 | 3.00 | 2.00 |
| Total | 60.00 | 60.00 | 30.00 | 150.00 | 100.00 |

*Prepared as described in U.S. Pat. No. 7,559,639.

Curable solid ink compositions are described that provide, in embodiments, a two to three-fold increase in hardness before cure over previously available compositions while achieving a high cure rate and hardness after cure. The viscosity of the ink composition of Example 9 was found to be 8.83 centipoise at 90° C. (jetting temperature).

In addition, since the radiation curable solid ink compositions contain a low concentration of crystalline waxes, it was found that the shrinkage upon cooling from jetting temperature was less than about 5% shrinkage, compared to more than about 10% shrinkage observed for conventional solid inks. Shrinkage was measured by pouring about 6.7 mL of molten overcoat into a copper mold of 35 millimeters in diameter and 7 mm in height. The ink was left to cool for a minimum of 12 h and the shrinkage determined from the diameter of the solidified overcoat and of the mold, making the assumption that that shrinkage in y- and x-direction (height) are the same. We believe this will enable vast improvements, or even elimination, of the current maintenance cycle that is used with solid ink jet printers. If we assume that shrinkage is changing linearly with the ratio of amorphous and crystalline wax components, a reduction of 10% in amount of crystalline wax would reduce shrinkage by about 1 to 1.5% or if crystalline wax is present at less than 20%, shrinkage would be less than about 4% instead of greater than 10%.

In embodiments, the radiation curable solid ink compositions herein comprise a low concentration of crystalline wax, wherein the amount of crystalline or semi-crystalline wax is from about 20 to about 50 percent by weight, based on the total weight of the radiation curable solid ink composition.

The ink was found to have a broad crystallization peak before cure. Without wishing to be bound by theory, it is believed that the broad crystallization peak before cure facilitates both direct to paper printing, for example where the substrate is maintained between room temperature (about 20 to about 25° C.) and about 45° C., and excellent cure performance.

In order to evaluate the printing performance, 2 wt. %, based upon the total weight of the composition, of a blue olefin dye (24316, obtained from Eastman Kodak Co., Rochester, N.Y.) was added to the formulation of Example 9 (viscosity=8.83 centipoise at 90° C.) to be able to visualize the printed image. This dye containing ink was printed on a modified PHASER 8400 fixture using a PIJ printhead. The colored ink was printed at 95° C. on both plain and coated papers (4200®, XEROX DIGITAL COLOR XPRESSIONS+® and XEROX DIGITAL COLOR ELITE GLOSS®, available from Xerox Corporation). The paper was kept at constant temperatures: 35° C., 40° C. and 45° C., respectively, and the resulting prints were cured on a Fusion UV Systems LIGHTHAMMER® as described above.

The resulting print was a high resolution print with minimal show-through, and no smear after curing (2×32 feet/minute). Resistance to scratch after cure was enhanced when printed on warmer substrates which allowed for some coating penetration into the substrate and drop coalescence on paper.

It is believed that the robustness of the printed images can be further improved by system optimization including, for example, glossing the image under pressure, providing longer light exposure time and/or increased light intensity.

It is believed that curable solid inks have been formulated for the first time with high hardness at room temperature and fast cure rates. The curable solid inks herein retain the advantages of handling, safety, and print quality usually associated with solid, phase change inks but provide additional breakthrough performance enabling characteristics such as: jettability at temperatures of less than 100° C.; low shrinkage upon solidification from the melt; flexibility in design allowing for quick adaptability to customer requirements and market needs; gloss variation; hardness tuning; adhesion tuning; no post fusing/glossing step required for many applications; superior hardness compared to convention solid wax based inks; no smear; and recyclability of prints.

EXAMPLE II

Curable solid ink compositions were prepared by combining the components in the Tables below in the amounts listed according to the processes described herein. In addition to ingredients identified hereinabove in Example I, SR9003® is a low viscosity propoxylated (2) neopentyl glycol diacrylate monomer obtained from Sartomer Company, Inc.; UNILIN® 425 is a linear primary alcohol obtained from Baker Petrolite; FASCAT® 4202 catalyst is an organotin catalyst of the formula $C_{32}H_{64}O_4Sn$ obtained from Arkema Inc., Philadelphia, Pa.; EFKA® 4340 is a high molecular weight dispersing agent having an AB-diblock copolymer structure obtained from Ciba Specialty Chemicals Inc.; MICROLITH® Jet Magenta 2B is a magenta pre-dispersed pigment obtained from Ciba Specialty Chemicals Inc.

A derivative of a polyethoxylated octylphenol of the formula $(C_2H_4O)_n$-$C_{14}H_{22}O$ wherein n has an average value of about 1.5 (IGEPAL® CA210) was prepared as follows. To a 250 mL flask equipped with a stir magnet was charged a pre-melted mixture of 70 g of IGEPAL® CA210 (OH #214.92, molecular weight (MW)=261) and 80.0 g of UNILIN® 425 (OH #95.3, MW=589). The flask was placed in a 140° C. oil bath with thermometer and heated/stirred. After about 5 minutes, 30 g of isophorone diisocyanate (IPDI) (MW=222) was added, followed by three drops of FASCAT® 4202 catalyst. An exotherm was observed. After about 1.5 h, an infrared spectrum was obtained on the reaction product and no isocyanate peak (about 2230 cm$^{-1}$) was observed. The contents were poured into aluminum tins and allowed to cool and solidify.

In an embodiment of the process comprising (a) heating a monomer that is solid at room temperature to provide a molten solid monomer; (b) adding a curable wax, a non-curable wax, and a photoinitiator to the molten solid monomer to provide a molten ink base; (c) adding a dispersant to the molten ink base; and (d) a adding a pigment to the molten ink base with stirring to provide a curable pigmented ink composition, a pigmented curable solid ink was prepared by adding a magenta pigment (MICROLITH® Jet Magenta 2B, obtained from Ciba Specialty Chemicals Inc.) and a dispersant mix (CD406®+EFKA 4340® obtained from Ciba Specialty Chemicals Inc.) to a curable solid ink base as shown in Table 3. Specifically, the solid curable ink of Table 3 was obtained by adding 7.6 g of magenta pigment and a blend of 3.922 g of EFKA® 4340 in 1.765 g of CD406 to the ink base of Table 3 followed by 15 minutes of homogenization using a POLYTRON® at 10,000 rpm while maintaining the temperature at about 90° C. Particle size distribution of Q1 was multimodal with main peaks centered at 512 nm and 87 nm as measured with a Malvern Zeta Sizer® HT at 100° C.).

TABLE 3

| | Pigmented Curable Solid Ink Q1 | | | | |
|---|---|---|---|---|---|
| | Q1a | Q1b | Q1c | SUM | Weight % |
| Monomer | | | | | |
| CD406 ® | 20.615 | 20.615 | 20.615 | 61.845 | 27.697 |
| SR368 ® | 1.603 | 1.603 | 1.603 | 4.809 | 2.154 |
| CD587 ® | 12.558 | 12.558 | 12.558 | 37.674 | 16.872 |
| Curable Wax | | | | | |
| UNILIN ® 350 Acrylate* | 5.950 | 5.950 | 5.950 | 17.850 | 7.994 |
| Non-curable Wax | | | | | |
| Derivative A | 25.816 | 25.816 | 25.816 | 77.448 | 34.685 |
| Photoinitiator | | | | | |
| Irgacure ® 819 | 1.120 | 1.120 | 1.120 | 3.360 | 1.505 |
| Irgacure ® 184 | 1.617 | 1.617 | 1.617 | 4.851 | 2.173 |
| Irgacure ® 907 | 0.721 | 0.721 | 0.721 | 2.163 | 0.969 |
| Colorant | | | | | |
| Magenta Pigment | | | | 7.600 | 3.404 |
| Resin | | | | 1.064 | 0.477 |
| Pigment | | | | 6.536 | 2.927 |
| Dispersant Mix | | | | 5.686 | 2.547 |
| CD406 ® | | | | 1.765 | 0.790 |
| Dispersant | | | | 3.922 | 1.756 |
| Total | 70.00 | 70.00 | 70.00 | 223.29 | 100 |

*Prepared as described in U.S. Pat. No. 7,559,639

In an embodiment of the process wherein a liquid pigment concentrate is added to an ink base, the process comprising (a) providing a monomer that is liquid at room temperature; (b) adding a curable wax, a non-curable wax, and a photoinitiator to the liquid monomer to provide a liquid ink base; (c) preparing a liquid pigment concentrate comprising a pigment and a liquid curable monomer; and (d) adding the liquid pigment concentrate to the liquid ink base with stirring to provide a curable pigmented ink composition, a pigmented curable solid ink was prepared by adding a magenta pigment liquid concentrate (MICROLITH® Jet Magenta 2B) in SR9003® to a curable solid ink base as per Table 4. Specifically, the dispersant EFKA® 4340 in SR9003® (Mixture A) was obtained by mixing about 657.7 g (about 55% in methoxypropanol) commercial EFKA® 4340 with 557.3 g of SR9003®. This mixture was then rotary evaporated at 40° C. under vacuum to remove the methoxypropanol, affording a mixture comprising about 40.6% EFKA® 4340 in SR9003®.

A magenta pigment dispersion was prepared by adding 110 g of MICROLITH® Magenta JET 2B to a mixture comprising 271 g of Mixture A and 119 grams of SR9003® while homogenizing with a POLYTRON® set at 10,000 rpm. The mixture was homogenized for 30 minutes while maintaining a temperature of 70° C. To this was then added 233 g of SR9003® while homogenizing and continuing to homogenize for 5 minutes to afford a magenta dispersion having a 15% solids content. This liquid dispersion was then used to prepare the ink Q2 of Table 4.

The particle size was obtained as per Q1 ink. The Z-average particle size of Q2 measured under these conditions was 85 nm with no change in particle size due to freeze-thaw. The complex viscosity of Q2 was about 11 centipoise at 90° C. as measured on a TA INSTRUMENTS® RFS-3 (Rheometrics Fluid Spectrometer) strain-controlled rheometer. The viscosity for ink Q2 was independent of shear rate. The ink met all jetting requirements for XEROX® piezoelectric printers.

TABLE 4

Pigmented Curable Solid Ink Q2

|  | Q2a | Q2b | Q2c | SUM | Weight % |
|---|---|---|---|---|---|
| Monomer |  |  |  |  |  |
| CD406 ® | 20.615 | 20.615 | 20.615 | 61.845 | 23.787 |
| SR368 ® | 1.603 | 1.603 | 1.603 | 4.809 | 1.850 |
| CD587 ® | 12.558 | 12.558 | 12.558 | 37.674 | 14.490 |
| Curable Wax |  |  |  |  |  |
| Unilin ® 350 Acrylate* | 5.950 | 5.950 | 5.950 | 17.850 | 6.865 |
| Non-curable Wax |  |  |  |  |  |
| Derivative A Photoinitiator | 25.816 | 25.816 | 25.816 | 77.448 | 29.788 |
| Irgacure ® 819 | 1.120 | 1.120 | 1.120 | 3.360 | 1.292 |
| Irgacure ® 184 | 1.617 | 1.617 | 1.617 | 4.851 | 1.866 |
| Irgacure ® 907 | 0.721 | 0.721 | 0.721 | 2.163 | 0.832 |
| Colorant |  |  |  |  |  |
| Magenta Pigment Concentrate (15%) |  |  |  | 50.000 | 19.231 |
| SR9003 ® |  |  |  | 35.000 | 13.462 |
| Dispersant |  |  |  | 7.500 | 2.885 |
| Magenta Pigment |  |  |  | 7.500 | 2.885 |
| Total | 70.00 | 70.00 | 70.00 | 260.00 | 100 |

*Prepared as described in U.S. Pat. No. 7,559,639

In embodiments of the process wherein a solid pigment concentrate is added to an ink base, the process comprising (a) adding a monomer that is solid at room temperature to a dispersant in solution; (b) treating the solution of step (a) to remove liquid to provide a solid comprising monomer and dispersant; (c) adding a pigment to the solid monomer and dispersant of (b) with heating and stirring to provide a solid pigment concentrate; and (d) adding the solid pigment concentrate to a curable solid ink base comprising a curable wax, a non-curable wax, and a photoinitiator with heating and stirring to provide a curable pigmented ink composition, a pigmented curable solid ink was prepared by adding a solid magenta pigment concentrate (MICROLITH® Jet Magenta 2B) in CD406® as per Table 5 to a curable solid ink base as per Tables 6 and 7. Specifically, a solid curable pigment concentrate was obtained by first adding 123.4 g of CD406® to 92.3 g of a solution of EFKA® 4340 (about 56% solids content in methoxypropanol) to provide Mixture B. Mixture B was heated and rotary evaporated to remove methoxypropanol to provide 178.9 g of a mixture of EFKA® 4340 in CD406® (31% EFKA® 4340). This mixture was then used to prepare a magenta concentrate in CD406® by combining 178.9 g of Mixture B, 158 g of CD406®, and 86.5 g of MICROLITH® Magenta JET 2B and homogenizing using a POLYTRON® at a temperature of 90° C. for 15 minutes at 10,000 rpm to provide a 21% pigment dispersion.

The particle size was obtained as per Q1 ink. The Z-average particle size of Q7 measured under these conditions was 111 nm with no change in particle size due to freeze-thaw. The ink met the jetting requirements of XEROX® piezoelectric printers.

TABLE 5

Magenta Pigment Concentrate Composition

| CD406 ® | 66.4% |
|---|---|
| Dispersant | 12.6% |
| Magenta Pigment | 21% |

TABLE 6

Pigmented Curable Solid Ink Q3

|  | Q3a | Q3b | Q3c | SUM | Weight % |
|---|---|---|---|---|---|
| Monomer |  |  |  |  |  |
| CD406 ® | 8.948 | 8.948 | 8.948 | 26.844 | 11.93 |
| SR368 ® | 1.603 | 1.603 | 1.603 | 4.09 | 2.14 |
| CD587 ® | 12.558 | 12.558 | 12.558 | 37.674 | 16.74 |
| Curable Wax |  |  |  |  |  |
| Unilin ® 350 Acrylate* | 5.950 | 5.950 | 5.950 | 17.850 | 7.93 |
| Non-curable Wax |  |  |  |  |  |
| Derivative A Photoinitiator | 25.816 | 25.816 | 25.816 | 77.448 | 34.42 |
| Irgacure ® 819 | 1.120 | 1.120 | 1.120 | 3.360 | 1.49 |
| Irgacure ® 184 | 1.617 | 1.617 | 1.617 | 4.851 | 2.16 |
| Irgacure ® 907 | 0.721 | 0.721 | 0.721 | 2.163 | 0.96 |
| Colorant |  |  |  |  |  |
| Magenta Pigment Concentrate (21%) |  |  |  | 50.000 | 22.22 |
| CD406 ® (66.4%) |  |  |  | 33.200 | 14.76 |
| Dispersant (12.6%0 |  |  |  | 6.300 | 2.80 |
| Magenta Pigment (21%) |  |  |  | 10.500 | 4.67 |
| Total | 58.33 | 58.33 | 58.33 | 225.00 | 100 |

*Prepared as described in U.S. Pat. No. 7,559,639

TABLE 7

Pigmented Curable Solid Ink Q7

|  | Q7a |
|---|---|
| Monomer |  |
| CD406 ® | 2.008 |
| SR368 ® | 0.236 |
| CD587 ® | 1.849 |
| Curable Wax |  |
| Unilin ® 350 Acrylate-prepared as described in U.S. Pat. No. 7,559,639 | 0.876 |
| Non-curable Wax |  |
| Derivative A Photoinitiator | 2.976 |
| Irgacure ® 819 | 0.165 |
| Irgacure ® 184 | 0.238 |
| Irgacure ® 907 | 0.106 |
| Colorant |  |
| Magenta Pigment Concentrate | 1.547 |
| CD406 ® (66.4%) | 1.027 |
| Dispersant (12.6%0 | 0.195 |
| Magenta Pigment (21%) | 0.325 |
| Total | 10.00 |

In embodiments, processes for preparing pigmented curable solid inks herein retain the advantages of handling, safety, and print quality usually associated with solid, phase change processes and inks and curable solid inks formulated using dyes as colorants while further providing additional breakthrough performance enabling characteristics such as ease of manufacturing and improve cure speed when liquid curable concentrates are used, low shrinkage upon cooling to room temperature, direct to paper printing, superior hardness upon curing as compared to solid inks, no smear and increased stability including resistance to aggregation and shelf life, and excellent scratch resistance. In one embodiment for preparing the present pigmented curable solid inks, a pigment concentrate is prepared from a liquid monomer at room temperature, and in another embodiment, the pigment concentrate is prepared from a solid monomer heated above its melting point. In some embodiments, the inks obtained using the present processes provide an average particle size of less than about 120 nanometers which provides long term stability with little to no gravitational settling, do not require additional homogenization time during the ink making step. The pigment concentrates used to prepare the inks are stable; that is, they show no pigment aggregation upon aging for the concentrate prepared from a liquid monomer and no pigment aggregation upon freeze-thaw for the concentrate prepared from a solid monomer. Because the same dispersant is used for both concentrates, the present processes provide the ink formulator an additional degree of freedom where liquid, solid, or mixtures of both pigment concentrates can be used to prepare curable inks that have controlled solid state properties at room temperature up to their melting point.

EXAMPLE III

A pigment concentrate was obtained by first adding a dimethanol diacrylate cyclohexane difunctional monomer (CD406, 123.4 g, obtained from Sartomer) to a solution of EFKA 4340, a high molecular weight dispersing agent having an AB-diblock copolymer structure obtained from Ciba Specialty Chemicals Inc. in methoxypropanol (92.3 g total EFKA 4340 solution containing about 56% solids content). The resulting mixture was then heated to boiling (the temperature of which depended on vacuum conditions and was believed to be about 45° C. at about 20 torr) and rotary evaporated to remove methoxypropanol, yielding a mixture of EFKA 4340 in CD406 (178.9 g, 31% EFKA 4340). This mixture was then used to prepare a magenta pigment concentrate by combining 178.9 g of the EFKA 4340 and CD406 mixture with an additional 158 g of CD406 and 86.5 g of MICROLITH Magenta JET 2B pigment (obtained from Ciba Specialty Chemicals, HighPoint, N.C. and homogenizing the resulting mixture with an Ultra Terrax T50 IKA basic homogenizer obtained from IKA Works Inc., Wilmington, N.C. with a S50N-G-45G head at a temperature of 90° C. for 15 minutes at 10,000 rpm to yield a concentrated pigment dispersion containing 21% by weight pigment solids, 66.4% by weight CD406, and 12.6% by weight EFKA 4340 dispersant.

Thereafter were added into a 30 mL amber glass bottle, in the following order, the following ink components: CD406, 7.706 g; SR368 trifunctional monomer (tris(2-hydroxy ethyl) isocyanurate triacrylate, 0.804 g; CD587 acrylate ester, 0.804 g; UNILIN 350 acrylate, prepared as described in U.S. Pat. No. 7,559,639, 0.100 g; IRGACURE® 819 photoinitiator, 0.160 g; IRGACURE® 184 photoinitiator, 0.231 g; IRGACURE® 907 photoinitiator, 0.103 g; and the magenta pigment dispersion, 0.200 g, to obtain a magenta curable solid ink.

The curable solid ink thus prepared was tested with a K Printing Proofer (manufactured by RK Print Coat Instrument Ltd., Litlington, Royston, Herts, U.K.). In this method, the tested inks were melted onto a printing plate set at 90-95° C. and a roller bar fitted with uncoated MYLAR® polyethylene terephthalate transparency material was then rolled over the plate containing the melted ink on its surface. The ink on the MYLAR® was cooled, resulting in an image in the shape of a rectangular block. Images thus obtained were cured at 32, 90, 150, and 240 feet per minute. MEK rubs in the range of 50 to 75 were obtained at the lowest curing speed, demonstrating excellent adhesion on MYLAR®. Hardness of the cured ink image was greater than 90.

Rheological characteristics of the curable solid ink were obtained in the temperature range of 50° C. to 100° C. Complex viscosity was measured using a Rheometrics cone-plate viscometer (Model RFS-3, obtained from TA Instrument, New Castle, Del.). Complex viscosity is the typical measurement provided by a reciprocating plate rheometer. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^*=\eta'-i\eta''$; where $\eta'=G''/\omega$, $\eta''=G'/\omega$ and i is $\sqrt{-1}$. The results indicated that jettable viscosity can be achieved at temperatures of less than 65° C. and are shown in FIG. 1.

EXAMPLE IV

The process of Example III is repeated except that in the preparation of the pigment concentrate, MICROLITH Jet Yellow 4G pigment, available from Ciba Chemicals, Highpoint, N.C., is used instead of MICROLITH Magenta JET 2B, and except that the pigment concentrate is homogenized for 45 minutes instead of 15 minutes to result in a yellow curable solid ink. It is believed that similar results will be obtained.

EXAMPLE V

The process of Example IV is repeated except that in the preparation of the pigment concentrate, the 123.4 g of pure CD406 monomer is replaced with 123.4 g of a mixture of CD406 and SR368 in a ratio, by weight, of 7.78:1 to result in a yellow curable solid ink. It is believed that similar results will be obtained.

EXAMPLE VI

The process of Example III is repeated except that in the preparation of the pigment concentrate, Permanent Red LB01 VP2756 pigment, available from Clariant, Charlotte, N.C., is used instead of MICROLITH Magenta JET 2B, the pigment concentrate is homogenized for 25 minutes at 5000 rpm followed by 20 minutes at 10,000 rpm instead of for 15 minutes at at 10,000 rpm, and the 123.4 g of pure CD406 monomer is replaced with 123.4 g of a mixture of CD406 and SR368 in a ratio, by weight, of 3.16:1 to result in a red curable solid ink. It is believed that similar results will be obtained.

EXAMPLE VII

The process of Example VI is repeated except that in the preparation of the pigment concentrate, the 86.5 g of Permanent Red LB01 VP2756 pigment is replaced with 110 g, and except that in the preparation of the ink, the 0.200 g of red pigment dispersion is replaced with 0.180 g to result in a red curable solid ink. It is believed that similar results will be obtained.

EXAMPLE VIII

The process of Example VII is repeated except that in the preparation of the ink, no SR368 monomer is used, the 0.804 g of CD587 acrylate ester is replaced with 1.508 g, and the 0.100 g of UNILIN 350 acrylate is replaced with 0.200 g to result in a red curable solid ink. It is believed that similar results will be obtained.

EXAMPLE IX

The process of Example VII is repeated except that in the preparation of the pigment concentrate, MICROLITH Magenta JET 2B pigment is used instead of Permanent Red LB01 VP2756 pigment, and except that in the preparation of the ink, 0.5 g SR368 monomer is used instead of 0.804 g, the 0.804 g of CD587 acrylate ester is replaced with 1.008 g, and the 0.100 g of UNILIN 350 acrylate is replaced with 0.200 g to result in a magenta curable solid ink. It is believed that similar results will be obtained.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A radiation curable solid ink composition comprising:
    (a) a curable wax comprising the reaction product of a hydroxylated or carboxylated ethylenic wax with acrylic or methacrylic acid to form an acrylated or methacrylated wax;
    (b) at least one curable monomer, oligomer, or prepolymer;
    (c) at least one photoinitiator; and
    (d) a pigment colorant;
    wherein the ink is a solid at a first temperature of about 25° C. or lower; and
    wherein the ink is a liquid at a second temperature of about 40° C. or higher;
    said ink being curable by free-radical polymerization.

2. An ink according to claim 1 wherein the ink carrier is substantially free of non-curable components.

3. An ink according to claim 1 further containing a non-curable wax.

4. An ink according to claim 3 wherein the non-curable wax is an ethoxylated octylphenol derivative.

5. An ink according to claim 1 wherein the curable wax comprises the reaction product of a compound of the formula $CH_3—(CH_2)_n—CH_2OH$ wherein n is an integer representing the number of repeat $CH_2$ groups with acrylic acid or methacrylic acid.

6. An ink according to claim 5 wherein the curable wax has a number average molecular weight of about 375 g/mol.

7. An ink according to claim 1 wherein the curable wax is present in the ink in an amount of from about 1 to about 40 percent by weight.

8. An ink according to claim 1 having a pre-cure hardness in the range of from about 5 to about 50 at room temperature.

9. An ink according to claim 1 wherein the radiation curable ink forms a semi-solid state at an intermediate temperature between a jetting temperature and a substrate temperature and wherein the radiation curable solid ink composition remains in a liquid or semi-solid state for a period of time prior to solidification on the substrate.

10. An ink according to claim 1 wherein the ink has a hardness value after curing of greater than about 90.

11. An ink according to claim 1 wherein the pigment colorant comprises Pigment Violet 19.

12. An ink according to claim 1 wherein the ink exhibits a shrinkage value of no more than about 10%.

13. An ink according to claim 1 wherein the ink exhibits a shrinkage value of no more than about 5%.

14. An ink according to claim 1 wherein the ink exhibits an MEK rub value of at least about 50.

15. A radiation curable solid ink composition comprising:
    (a) a curable wax comprising the reaction product of a hydroxylated or carboxylated ethylenic wax with acrylic or methacrylic acid to form an acrylated or methacrylated wax;
    (b) at least one curable monomer, oligomer, or prepolymer;
    (c) at least one photoinitiator; and
    (d) a pigment colorant present in an amount of from about 0.1 to about 15 percent by weight;
    wherein the ink is a solid at a first temperature of about 25° C. or lower; and
    wherein the ink is a liquid at a second temperature of about 40° C. or higher;
    said ink being curable by free-radical polymerization;
    said ink being substantially free of non-curable components;
    said ink exhibiting a shrinkage value of no more than about 10%;
    said ink exhibiting a hardness value after curing of at least about 90;
    said ink exhibiting an MEK rub value of at least about 50.

16. A process which comprises:
    (1) incorporating into an ink jet printing apparatus a radiation curable solid ink composition comprising:
        (a) a curable wax comprising the reaction product of a hydroxylated or carboxylated ethylenic wax with acrylic or methacrylic acid to form an acrylated or methacrylated wax;
        (b) at least one curable monomer, oligomer, or prepolymer;
        (c) at least one photoinitiator; and
        (d) a pigment colorant;
        wherein the ink is a solid at a first temperature of about 25° C. or lower; and
        wherein the ink is a liquid at a second temperature of about 40° C. or higher;
        said ink being curable by free-radical polymerization;
    (2) melting the ink;
    (3) causing droplets of the melted ink to be ejected in an imagewise pattern onto a substrate; and
    (4) exposing the imagewise pattern to ultraviolet radiation.

17. A process according to claim 16 wherein the substrate is a final recording sheet and droplets of the melted ink are ejected in an imagewise pattern directly onto the final recording sheet.

18. A process according to claim 16 wherein the substrate is an intermediate transfer member and droplets of the melted ink are ejected in an imagewise pattern onto the intermediate transfer member followed by transfer of the imagewise pattern from the intermediate transfer member to a final recording sheet.

19. A process according to claim 18 wherein the imagewise pattern is exposed to ultraviolet radiation on the final recording sheet.

20. A curable solid ink jet ink stick or pellet which comprises a radiation curable solid ink composition comprising:
(a) a curable wax comprising the reaction product of a hydroxylated or carboxylated ethylenic wax with acrylic or methacrylic acid to form an acrylated or methacrylated wax;
(b) at least one curable monomer, oligomer, or prepolymer;
(c) at least one photoinitiator; and
(d) a pigment colorant;
wherein the ink is a solid at a first temperature of about 25° C. or lower; and
wherein the ink is a liquid at a second temperature of about 40° C. or higher;
said ink being curable by free-radical polymerization.

* * * * *